US005738156A

United States Patent [19]
Stewart

[11] Patent Number: 5,738,156
[45] Date of Patent: *Apr. 14, 1998

[54] REMOVABLE CUTTING BLADES FOR A HELICAL CUTTERHEAD

[76] Inventor: John S. Stewart, 6921 Charnel La., Climax, N.C. 27233

[*] Notice: The term of this patent shall not extend beyond the expiration date of Pat. No. 5,603,365.

[21] Appl. No.: 748,633

[22] Filed: Nov. 13, 1996

Related U.S. Application Data

[63] Continuation-in-part of Ser. No. 559,024, Nov. 16, 1995, Pat. No. 5,603,365.
[51] Int. Cl.⁶ ............................... B27L 1/00; B27C 1/00; B26D 1/00
[52] U.S. Cl. .................... 144/373; 144/230; 144/241; 144/329; 407/47; 407/48
[58] Field of Search ............... 407/46–49, 67–69, 407/101–103, 113; 144/116, 117.1, 218, 221, 230, 241, 329, 373

[56] References Cited

U.S. PATENT DOCUMENTS 4,265,574  5/1981  Eckle ............................ 407/48
4,830,073  5/1989  De Abreu ..................... 144/241
5,603,365  2/1997  Stewart ........................ 144/241

*Primary Examiner*—W. Donald Bray
*Attorney, Agent, or Firm*—Rhodes Coats & Bennett, L.L.P.

[57] ABSTRACT

A removable cutterhead insert for use in a helical cutterhead for an industrial woodworking machine, the helical cutterhead including a generally cylindrical portion, a plurality of circumferential, spaced grooves extending into the cutterhead body from the periphery of the cylindrical portion and adapted to receive the removable cutterhead inserts, and fasteners for removably securing the cutterhead inserts in the grooves; the cutterhead insert includes a mild steel insert body and two blade units; the insert body having raised portions having triangular pockets formed therein so as to have two inwardly-facing flat portions, a hole to receive the fasteners for removably securing the cutterhead insert in the grooves between the inwardly-facing flat portions and two bolt holes to secure the two blade units to the insert body; and the blade units are triangular with cut-off corners each including a blade edge and configured so as not to occlude the countersunk hole and to have the blades edges disposed to align with the blade edges of other blade units in other insert bodies to form a substantially helical blade when the blade units are secured to the insert body in a cutterhead.

16 Claims, 3 Drawing Sheets

REMOVABLE CUTTING BLADES FOR A HELICAL CUTTERHEAD

CROSS-REFERENCE TO RELATED APPLICATIONS

The present application is a continuation-in-part of U.S. Pat. application Ser. No. 08/559,024, filed Nov. 16, 1995 (now U.S. Pat. No. 5,603,365 issued Feb. 18, 1997.

BACKGROUND OF THE INVENTION

The present invention relates to improvements in helical cutterheads, particularly cutterheads such as those shown in my prior U.S. Pat. No. 4,074,737, the entire disclosure of which is incorporated herein by reference.

My prior patent discloses a helical cutterhead for a planer having a particular pitch arrangement to reduce the noise generated by the cutterhead while planing a workpiece. The cutterhead has a plurality of segmented cutterhead inserts, each of which includes a cutting blade mounted in cooperating or receiving grooves in the cutterhead body. In a typical arrangement, the cutterhead inserts span about one inch along the cutterhead length. The cutterhead inserts are securely mounted in the grooves to form a substantially continuous cutting edge. As set forth in that patent, the contour of the actual cutting edge of the blades preferably follows the contour of the helical groove in the cutterhead.

In one embodiment described in the '737 patent, the cutterhead inserts have carbide cutting blades brazed or welded to them. The carbide blade, after brazing to the cutterhead insert, is subsequently ground to obtain a helical geometry in keeping with the entire helix of the cutterhead. When the cutting blade is worn out, the entire cutterhead insert must be replaced or returned to a toolshop for retipping and regrinding.

In the prior art cutterheads, the brazing method of attachment limits the materials which can be used as the cutting blades to those that can withstand brazing, such as conventional carbide. However, more advanced cutting materials including diamonds, ceramics, coated materials, etc. would be difficult to braze and impractical to use as the entire cutterhead insert.

Thus, there is a need in the art for a cutterhead insert that permits other blade materials to be used to form the cutting edge, as well as increases the flexibility and ease of replacement of blades as they are worn or damaged.

SUMMARY OF THE INVENTION

The present invention fulfills this need in the art by providing a removable cutterhead insert for use in a cutterhead for an industrial woodworking machine, the cutterhead including a generally cylindrical portion, a plurality of circumferential, spaced grooves extending into the cutterhead body from the periphery of the cylindrical portion and adapted to receive the removable cutterhead inserts, and means for removably securing the cutterhead insert in the grooves. The cutterhead insert includes an insert body and two blade units, the insert body having a hole to receive the means for removably securing the cutterhead insert in the grooves and two blade unit securements to secure the two blade units. The blade units each include a cutting edge and are configured so as not to occlude the hole in the insert body to receive means for removably securing the cutterhead insert in the grooves. The blades edges are disposed to align with the blade edges of other blade units in other insert bodies to form a substantially helical cutting edge when the blade units are secured to the cutterhead inserts and installed in helical grooves in a cutterhead.

Preferably, the body includes two blade unit pockets and flat raised portions adjacent the pockets. Each blade unit includes flat sides that abut the flat raised portions of the cutterhead insert adjacent the pockets.

More preferably, the cutterhead insert body includes two generally triangular pockets and the blade units are also generally triangular so as to include two flat sides that abut the flat raised portions of the cutterhead insert body adjacent the pocket. The triangular blade units may have three sharp sides, one of which serves as the cutting blade edge when oriented in a cutting position on the insert body.

The two triangular pockets in the body accepts two triangular blade units, each having cut-off corners so that the cut-off corners of adjacent blade units abut one another or lie adjacent to one another when the cutting edges of the adjacent blade units are aligned. Preferably, each generally triangular blade unit includes one sharp cutting edge and two flat sides that abut the flat raised portions adjacent the triangular pockets of the body. The two flat sides and cut-off corners of each blade unit impart a configuration to the blade unit that somewhat resembles home plate of a baseball diamond.

In another aspect, the body has two triangular pockets that each include two inwardly-facing flat portions, wherein the hole to receive the means for removably securing the cutterhead insert in the grooves is located in the body between the two triangular pockets.

Desirably, the blade unit is made of material selected from the group of hard materials consisting of diamond, ceramic, carbide, high cobalt alloys, and high speed steels. The insert body may be made of mild steel.

In a preferred embodiment, the hole to receive the means for removably securing the cutterhead insert in the grooves is a counterbored or countersunk hole and the two blade unit securements to secure the two blade units are also countersunk or counterbored or similar holes. The two blade unit securements to secure the two blade units may include triangular pockets and the blade units may be triangular.

The invention also provides a cutterhead for an industrial woodworking machine including a generally cylindrical portion having a plurality of circumferential, spaced grooves extending into the cylindrical portion from the periphery of the cylindrical portion and adapted to receive removable cutterhead inserts, means for removably securing the cutterhead inserts in the grooves, and a plurality of cutterhead inserts which each include an insert body and two blade units. The insert bodies have a hole to receive the means for removably securing the cutterhead insert in the grooves and two blade unit securements to secure the two blade units. The blade units each include a blade edge and are configured so as not to occlude the hole to receive the means for removably securing the cutterhead insert in the grooves and to have the blades edges disposed to align with the blade edges of other blade units in other cutterhead insert bodies to form a substantially helical cutting edge when the blade units are secured by the blade unit securements in the cylindrical portion.

The blade units can be changed when damaged or dull by removing the cutterhead inserts from the helical grooves, removing the blade units from the cutterhead inserts, replacing the damaged or dull blades with new sharp blades, and reattaching the cutterhead inserts to the helical cutterhead.

The invention also provides a method of changing blades in a cutterhead including leaving the removable cutterhead inserts in place, removing blade units from the cutterhead inserts, and mounting replacement blade units in the cutterhead inserts.

The removing step may include loosening bolts securing the blade units to the cutterhead inserts.

The mounting step may include inserting triangular blade units into the cutterhead inserts and tightening bolts securing the blade units to the cutterhead inserts so as to form a substantially helical blade when the blade units are secured by the blade unit securements to the cutterhead inserts, which are in turn attached to the cutterhead in the helical groove.

The method may also include securing the blade units in position by urging a flat face of the blade units against flat raised portions of the insert body adjacent the triangular pockets.

The invention also provides a blade unit for a cutterhead insert for a helical cutterhead including a substantially triangular-shaped blade unit body having a blade edge, a flat side, cut-off corners in opposition to said flat side, so that adjacent blade units have abutting or adjacent cut-off corners and opposed flat sides, and a mounting hole.

Preferably, the blade unit has a raised portion along the cutting edge to allow for repeated grinding and sharpening of the cutting edge.

The blade unit body may alternately have three sharp sides, each of which may serve as a cutting blade when oriented in a cutting position on a cutterhead insert body.

The blade unit may be made of a material selected from the group of hard materials including diamond, ceramic, carbide, high cobalt alloys, and high speed steels.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

Figure 1:
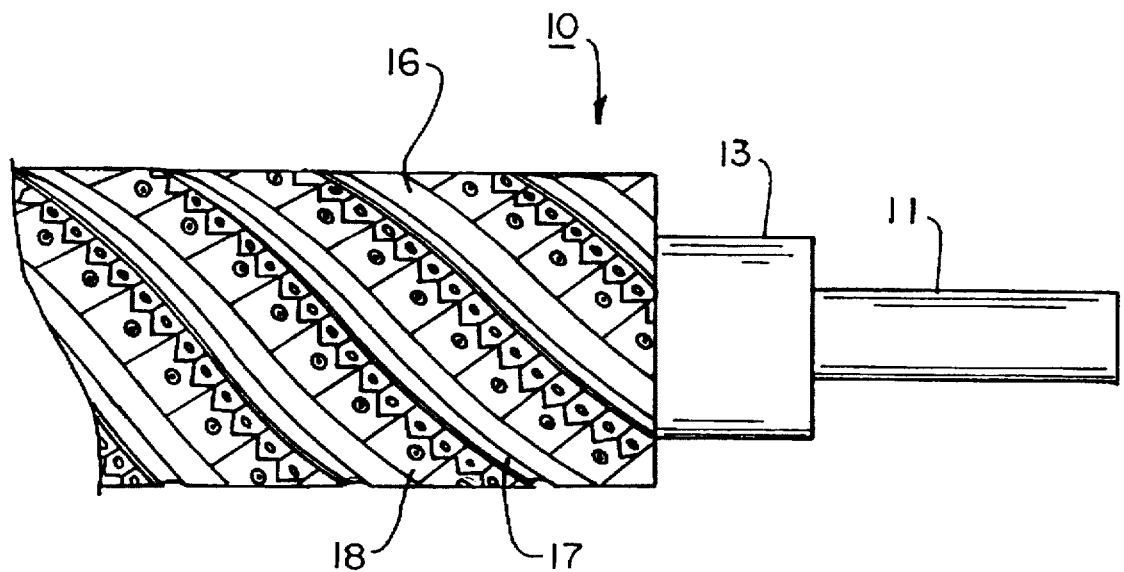
FIG. 1 is a top view of one end of a helical cutterhead outfitted with cutterhead inserts according to an embodiment of the invention.

Referring to the drawings in general and in particular to FIG. 1, there is illustrated a cutterhead 10 for a woodworking machine incorporating one embodiment of this invention in which axially-extending stub-shaft ends 11 may be bearingly supported for rotation. An intermediate section 13 at each end of the cutterhead may be provided depending upon the type of machine employed and space requirements, particularly in existing machines for retrofitting. The main cylindrical body 16 of the cutterhead is provided with a series of helical grooves or indentations 17 in circumferentially spaced relationship throughout the main cylindrical body 16 of the cutterhead 10. A series of segmented cutterhead inserts 18 is removably secured to the cutterhead body 16 within helical grooves 17 and in abutting cooperative relationship with each other and the grooves to form substantially continuous cutting edges for each of the helices.

The cutterhead 10 continues for an extended length, depending on the machine's width, and may be bored to fit in an arbor assembly of a planer or have a terminating end which is the mirror image of the end having stub shaft end 11 shown in FIG. 1.

Figure 2:
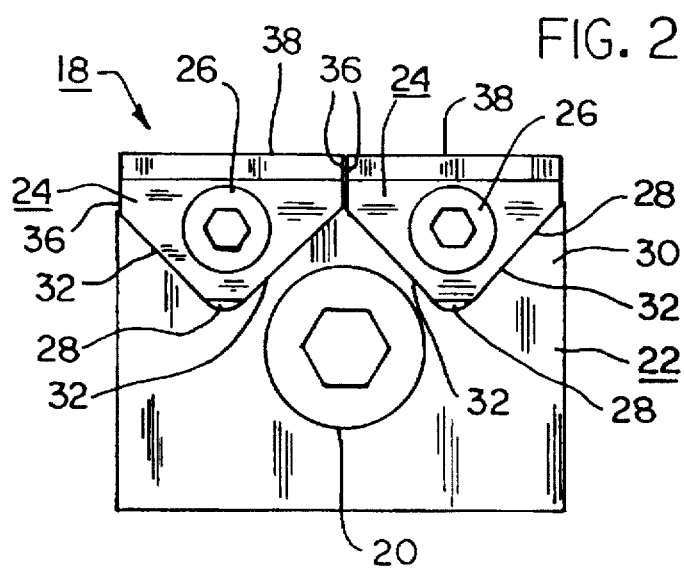
FIG. 2 is an enlarged top view of a cutterhead insert according to the embodiment of FIG. 1.

Referring now to FIG. 2, an enlarged view of the cutterhead insert 18 can be seen. The cutterhead insert 18 includes a cutterhead insert body 22 and two blade units 24. The cutterhead insert body 22 is configured to be of the same size and helical geometry as the cutterhead inserts previously made for cutterheads, and to be interchangeable therewith. However, other sizes can also be used if retrofitting capability is not needed. Preferably, the body 22 is made of mild steel; however, the insert body may also be made of other materials, such as case-hardened steel.

The cutterhead insert body 22 has two triangular pockets 28 formed therein on alternate sides of a holder bolt opening 20. The holder bolt opening 20 is counterbored or countersunk to receive a bolt to bind the cutterhead insert body 22 into the helical groove 17 of the cutterhead 10. Each triangular pocket 28 is bordered by a substantially flat raised portion 30 of the cutterhead insert body 22.

The blade units 24 are configured identically, so that the parts are interchangeable. As can be seen, the blade unit 24 is preferably of a triangular shape, although any suitable shape which does not occlude the opening for the holder bolt 20 may be used. A suitable configuration of the pocket 28 to accommodate the configuration of the blade units is appropriate. The blade unit 24 includes flat sides 32 to bear against the flat raised portion 30 of the body. Opposed to each flat side 32 is a flat, cut-off corner 36. A second, similar cut-off corner 36 on the adjacent blade unit abuts or is disposed adjacent to the first cut-off corner 36. The two blade units 24 are held in position in their respective triangular pockets 28 by bearing against a flat raised portion of the body.

The blade units 24 are secured to the insert body 22 by fasteners such as machine screws or bolts 26 into receiving, tapped and threaded holes in the cutterhead insert body 22 (not shown). However, the positioning of the holes for the bolts 26 in the blade units 24 should be such so that, when pressure is exerted on the blade edge 38, the force is not borne by the bolt 26, but rather by the wedging of the blade unit 24 against the flat raised portions 30 of the body adjacent the pockets.

The cut-off corners 36 may actually abut or contact the cut-off corners of adjacent blade units, both in the same cutterhead insert body and in adjacent cutterhead insert bodies. However, it is preferable that there be small spaces in between adjacent blade units. Therefore, when pressure is exerted on the blade edge 38, the force is only borne by the wedging of that particular blade unit 24 against the flat raised portions of the insert body adjacent that particular blade unit's pocket. For example, each blade unit may be spaced from the adjacent blade units so as to leave approximately a 0.005 inch gap therebetween. Accordingly, if adjacent cutterhead insert bodies abut when mounted in the helical groove, the blade units are each recessed approximately 0.0025 inches from the side edges of the cutterhead insert bodies.

As can be appreciated from viewing FIG. 2, the bulk of the cutterhead insert's volume is taken up by the insert body 22, so that the blade units 24 are of somewhat smaller size and can be made entirely of a hard material such as carbide, ceramic, diamond, high cobalt alloy, or high speed steel.

The blade unit may include a raised portion along one edge to provide material for regrinding. In this configuration, only one of the edges of the triangular blade can be used for cutting.

Alternately, if desired, each of the three triangular sides of blade units 24 can be made in a sharpened configuration, like the sharpened blade edge 38, so that, upon dulling of one side edge, the blade unit 24 can be loosened, rotated 120° and remounted, to make a fresh face available for sharpened cutting.

The blade edge 38 need not be ground to match the cutterhead helix. It can simply be a straight edge. Since the edge is relatively short, its mounting in the triangular pockets 28 of the insert body 28 and, in turn, in the grooves 17 of the cutterhead 10 locates them in close enough approximation to the helices desired to adequately form the helical shape. The blade units 24 may have their outside diameters ground in a circle to approximate the helix when two blade units 24 are positioned in their respective triangular pockets 28. The pockets are milled to be oriented parallel to the chord of the helical curve on each side of the insert body hole 20, so that a helical arc is approximated. More preferably, the triangular pockets 28 are milled in the insert body 20 so as to dispose the blade edge 38 to assume the helical geometry. Still more preferably, the blade edge 38 can be ground to be a closer approximation to a true helix.

Also, the blade units 24 need not be triangular. A desired shape which does not occlude the bolt 20 is suitable. However, it is generally preferred that the blade unit be configured and disposed so as to have flat edges to abut the flat raised portions of the insert body adjacent the triangular pockets to bear against during a cutting operation.

The top and front faces of the blade edge 38 are usually ground to provide an extremely sharp edge. This can be done on a helical grinder to provide a true helical cutting edge or approximated by straight grinds at the proper orientation to form a stepwise helical edge. The triangular blade unit 24 has a flat seat which mates with the flat pocket milled in the cutterhead insert body 22.

Figure 3:
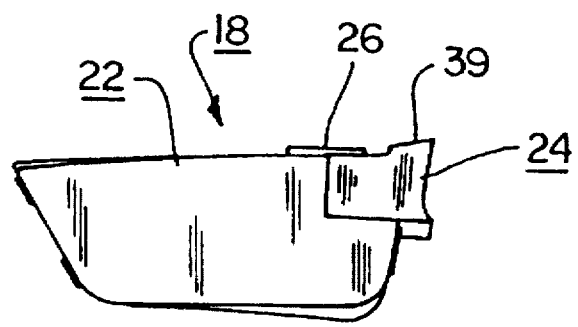
FIG. 3 is an enlarged side view of the cutterhead insert shown in FIG. 2.
Figure 4:
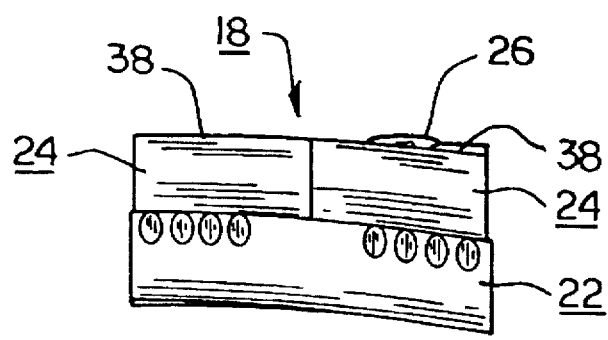
FIG. 4 is an enlarged front view of the cutterhead insert shown in FIG. 2.
Figure 5:
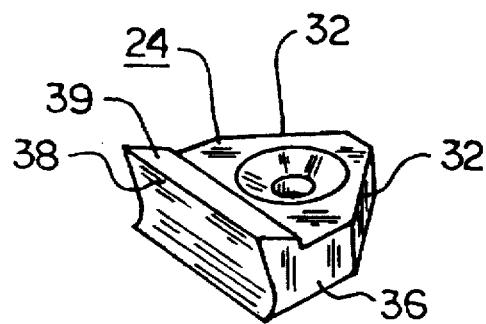
FIG. 5 is an enlarged perspective view of an individual blade unit.

FIG. 3 is an enlarged side view of the cutterhead insert shown in FIG. 2. FIG. 4 is an enlarged front view of the cutterhead insert shown in FIG. 2. FIG. 5 is an enlarged perspective view of an individual blade unit.

Mechanically attaching the cutting blade, as opposed to a present brazed attachment, provides several advantages. These include ease of cutting blade replacement. The body 22 can be simply refitted with new blade units as opposed to replacing or refurbishing the entire cutterhead insert. Also, the use of mechanically attached cutting blade units 24 facilitates the use of non-brazable tool edge materials and tool materials which are difficult or impractical to attach by brazing. The use of mechanically attached cutting blades also facilitates the use of a non-grindable tool edge material and tools materials which are difficult or impractical to grind after the tool insert is attached. Finally, the mechanically attached cutting blade avoids quality problems associated with brazing stresses and poor wetability.

In operation, the blade units can be changed in a cutterhead in a straightforward fashion. The cutterhead insert body 22 can be left in place in the groove of the cutterhead during replacement or the entire cutterhead insert can be removed. The machine screws or bolts 26 are simply loosened to allow removal of the blade units 24 and remounting of replacement blade units 24 in the cutterhead insert body 22. The new blade units 24 are mounted so that their flat sides 32 abut the flat raised portion 30 of the body adjacent the pockets to hold the blade unit in place. The adjacent cutoff corners 36 are similarly abutting or, preferably, closely adjacent to minimize the gap between the blades. The adjacent blade edges form a substantially helical cutting edge, taking into account the multiplicity of blade units 24.

Figure 6:
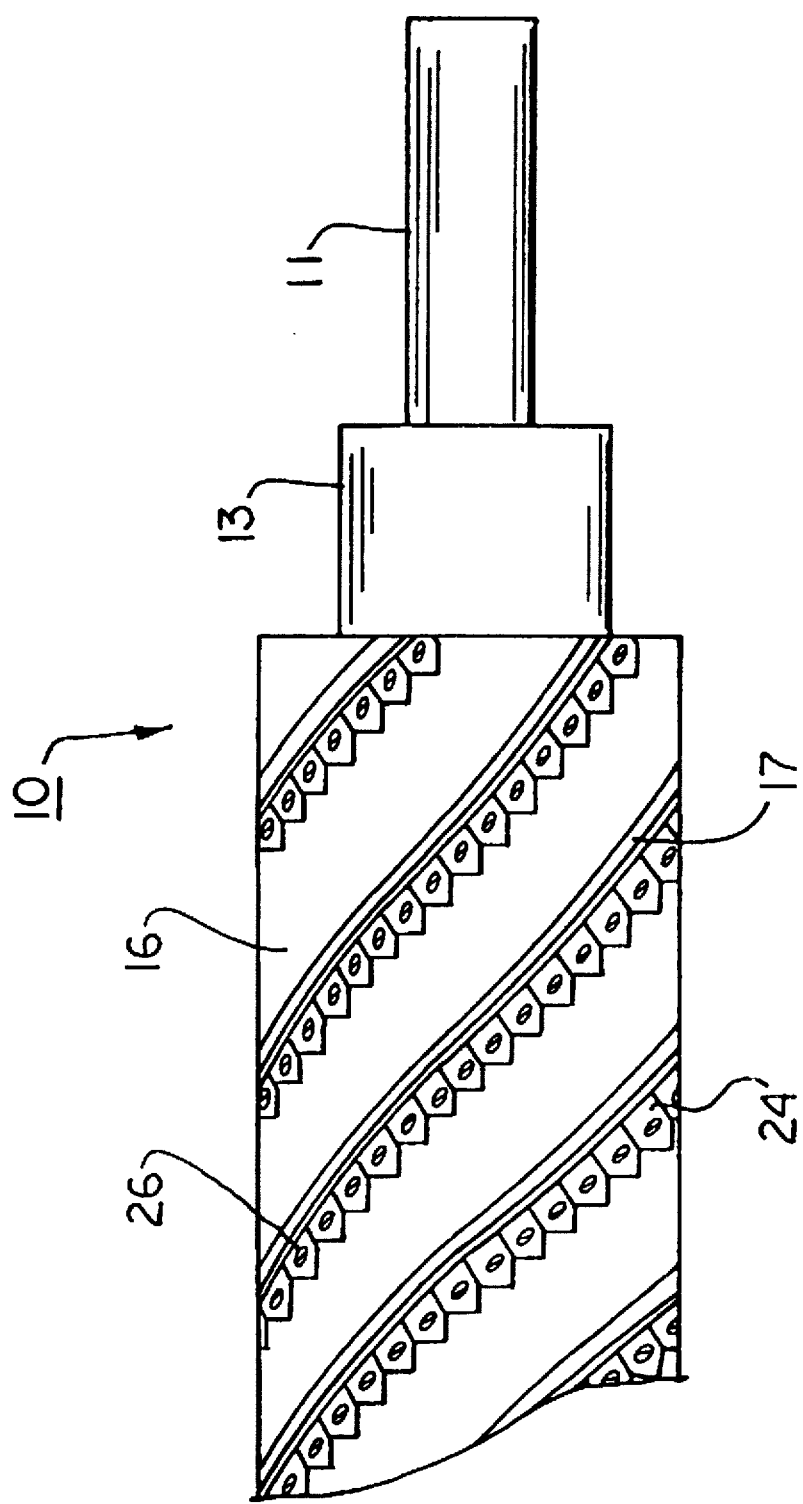
FIG. 6 is an alternative embodiment in which the individual blade units are mounted directly into the cutterhead.

In an alternative embodiment, shown in FIG. 6, the individual blade units are mounted directly into a specially modified cutterhead adapted to receive the individual blade units.

Those of ordinary skill in the art will appreciate that the invention can be carried out with various other minor modifications from that disclosed herein, and same is deemed to be within the scope of this invention.

I claim:

1. A cutterhead for an industrial woodworking machine, the cutterhead including a generally cylindrical portion, a plurality of circumferential, spaced grooves extending into the cutterhead body from the periphery of the cylindrical portion, said grooves including a plurality of blade unit mounting cavities, and means for removably securing each of the removable blade units in its respective mounting cavity in the grooves, the blade unit mounting cavity comprising:

a hole to receive the means for removably securing the blade unit in its respective mounting cavity in the grooves, and at least one flat raised portion, said blade units each including at least one blade edge and configured to have said blade edges disposed to align with blade edges of other blade units in other mounting cavities to form a substantially helical blade when said blade units are secured to said blade unit securements in a cutterhead, said blade units each including a flat side that abuts one of said flat raised portions of said blade unit mounting cavity, wherein said mounting cavity further includes flat raised portions and said blade units are triangular with cut-off corners so that adjacent blade units have adjacent cut-off corners and include a flat side that abuts one of said flat raised portions.

2. An apparatus as claimed in claim 1 wherein said mounting cavity includes flat raised portions and said blade units are each triangular so as to include a flat side that abuts one of said flat raised portions.

3. An apparatus as claimed in claim 1 wherein said flat raised portions are located on said mounting cavity so as to be in opposition to said abutting cut-off corners.

4. An apparatus as claimed in claim 1 wherein said mounting cavity has a raised portion that includes two inwardly-facing flat portions and said hole to receive the means for removably securing the blade unit mounting cavity in the grooves is located between said inwardly-facing flat portions.

5. An apparatus as claimed in claim 1 wherein said blade unit is made of material selected from the group consisting of diamond, ceramic, carbide, high cobalt alloys, and high speed steel.

6. An apparatus as claimed in claim 1 wherein said cutterhead is made of mild steel.

7. An apparatus as claimed in claim 1 wherein said blade unit securements to secure said blade units are bolt holes.

8. An apparatus as claimed in claim 1 wherein said blade unit securements to secure said blade units include triangular pockets and said blade units are triangular.

9. An apparatus as claimed in claim 1 wherein the blade edge of each said blade unit is raised to facilitate regrinding.

10. A cutterhead for an industrial woodworking machine, the cutterhead including a generally cylindrical portion, a plurality of circumferential, spaced grooves extending into the cutterhead body from the periphery of the cylindrical portion, said grooves including a plurality of removable blade unit mounting cavities, and means for removably securing each of the removable blade units in its respective mounting cavity in the grooves, the blade unit mounting cavity comprising:

triangular pockets formed therein so as to have two inwardly-facing flat portions, bolt holes to secure said blade units to said mounting cavity, said blade units being triangular with cut-off corners each including a blade edge and a flat side and configured to have said blades edges disposed to align with other blade units in other mounting cavities to form a substantially helical blade when said blade units are secured to said mounting cavity in a cutterhead when seated in said triangular pockets and include a flat side that abuts one of said flat raised portions and secured by bolts in said bolt holes.

11. A cutterhead for an industrial woodworking machine comprising a generally cylindrical portion having a plurality of circumferential, spaced grooves extending into the cylindrical portion from the periphery of the cylindrical portion, said grooves including a plurality of removable blade unit mounting cavities, means for removably securing each of the removable blade units in its respective mounting cavities in the grooves, and a plurality of blade unit mounting cavities which each include a mounting cavity and a blade units, said mounting cavities having a hole to receive the means for removably securing the blade unit and blade unit securements to secure said blade units, said blade units each including a blade edge and at least one flat side that abuts said blade unit securement and configured to have said blades edges disposed to align with other blade units in other mounting cavities to form a substantially helical blade when said blade units are secured to said blade unit securements in said cylindrical portion.

12. A method of changing blades in a cutterhead for an industrial woodworking machine, the cutterhead including a generally cylindrical portion, a plurality of circumferential, spaced grooves extending into the cutterhead body from the periphery of the cylindrical portion, said grooves including a plurality of removable blade unit mounting cavities and adapted to receive removable blade units, comprising removing blade units from the blade unit mounting cavities, and mounting replacement blade units in the blade unit mounting cavities.

13. A method as claimed in claim 12 wherein said removing step includes loosening fasteners securing the blade units to the blade unit mounting cavities.

14. A method as claimed in claim 12 wherein said mounting step includes inserting triangular blade units into the blade unit mounting cavities and tightening fasteners securing the blade units to the blade unit mounting cavities so as to form a substantially helical blade when the blade units are secured to the blade unit securements in the cutterhead.

15. A method as claimed in claim 12 further comprising securing the blade units in position by urging a flat face of the blade units against flat raised portions of the mounting cavity.

16. A method of changing blades in a cutterhead for an industrial woodworking machine, the cutterhead including a generally cylindrical portion, a plurality of circumferential, spaced grooves extending into the cutterhead body from the periphery of the cylindrical portion, said grooves including a plurality of removable blade unit mounting cavities and adapted to receive removable blade units, comprising removing blade units from the blade unit mounting cavities including loosening screws securing the blade units to the blade unit mounting cavities, and mounting replacement blade units in the blade unit mounting cavities by inserting triangular blade units into the blade unit mounting cavities, urging a flat face of the blade units against flat raised portions of the mounting cavity and tightening screws securing the blade units to the blade unit mounting cavities so as to form a substantially helical blade made up of blade units secured to the blade unit mounting cavity in the cutterhead.

* * * * *